United States Patent
Hutchison et al.

(10) Patent No.: US 8,520,529 B2
(45) Date of Patent: Aug. 27, 2013

(54) REORDERING NETWORK TRAFFIC

(75) Inventors: Michael Hutchison, Richmond (CA); Tom Keddie, Vancouver (CA)

(73) Assignee: Ixia, Calabasas, CA (US)

(*) Notice: Subject to any disclaimer, the term of this patent is extended or adjusted under 35 U.S.C. 154(b) by 152 days.

(21) Appl. No.: 13/234,060

(22) Filed: Sep. 15, 2011

(65) Prior Publication Data
US 2013/0070777 A1    Mar. 21, 2013

(51) Int. Cl.
*H04L 12/26*    (2006.01)

(52) U.S. Cl.
USPC ......................................................... 370/241

(58) Field of Classification Search
USPC .................. 370/241–249, 252, 253, 389, 394, 370/431, 464, 474
See application file for complete search history.

(56) References Cited

U.S. PATENT DOCUMENTS

| | | | |
|---|---|---|---|
| 6,246,684 B1 * | 6/2001 | Chapman et al. .............. | 370/394 |
| 6,625,689 B2 | 9/2003 | Narad et al. | |
| 6,717,917 B1 | 4/2004 | Weissberger et al. | |
| 6,920,120 B2 * | 7/2005 | Huang et al. .................... | 370/329 |
| 7,069,490 B2 * | 6/2006 | Niu et al. ....................... | 714/748 |
| 7,215,680 B2 * | 5/2007 | Mullendore et al. .......... | 370/412 |
| 7,233,573 B2 * | 6/2007 | Walls et al. .................... | 370/236 |
| 7,593,345 B2 | 9/2009 | Dubé et al. | |
| 7,633,939 B2 * | 12/2009 | Curran-Gray et al. ........ | 370/389 |
| 7,751,449 B2 | 7/2010 | Winters | |
| 8,040,908 B2 * | 10/2011 | Choi et al. ..................... | 370/414 |
| 8,135,024 B2 * | 3/2012 | Abel et al. ..................... | 370/412 |
| 2006/0088060 A1 | 4/2006 | Fujikami et al. | |
| 2006/0256720 A1 | 11/2006 | Curran-Gray et al. | |
| 2009/0003207 A1 | 1/2009 | Elliott | |
| 2010/0046520 A1 * | 2/2010 | Nakata .......................... | 370/394 |

OTHER PUBLICATIONS

Spirent Communications, Spirent GEM Ethernet Network Impairment Emulators, Network Playback Module for CES, TOP, MEF-18, G.8261, article, http://www.spirent.com/~/media/Datasheets/Broadband/PAB/GEM_Impairments/GEM_NW_Playback_Module_for_CES_TOP_MEF-18_G8261_Datasheet.pdf, accessed Jan. 17, 2012. pp. 1-4.

\* cited by examiner

*Primary Examiner* — Dmitry H Levitan
(74) *Attorney, Agent, or Firm* — SoCal IP Law Group LLP; John E. Gunther; Steven C. Sereboff (57) ABSTRACT

Impairment units and methods for impairing network traffic. An impairment unit may receive packets from a network and determine an impairment class of each packet from a plurality of impairment classes. Input logic may determine whether or not each received packet will be reordered. A received packet not to be reordered may be stored in a normal traffic FIFO queue uniquely associated with the impairment class of the received packet. A received packet to be reordered may be stored in a reorder traffic FIFO queue uniquely associated with the impairment class of the received packet. Output logic may select a sequence of packets from head ends of the plurality of normal traffic FIFO queues and the plurality of reorder traffic FIFO queues to provide outgoing traffic. A transmitter may transmit the outgoing traffic to the network.

20 Claims, 8 Drawing Sheets

REORDERING NETWORK TRAFFIC

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to generating connections for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols.

Layer 1 protocols define the physical (electrical, optical, or wireless) interface between nodes of the network. Layer 1 protocols include various Ethernet physical configurations, the Synchronous Optical Network (SONET) and other optical connection protocols, and various wireless protocols such as Wi-Fi.

Layer 2 protocols govern how data is logically transferred between nodes of the network. Layer 2 protocols include the Ethernet, Asynchronous Transfer Mode (ATM), Frame Relay, and Point to Point Protocol (PPP).

Layer 3 protocols govern how packets are routed from a source to a destination along paths connecting multiple nodes of the network. The dominant layer 3 protocols are the well-known Internet Protocol (IP) version 4 (IPv4) and version 6 (IPv6). A packet switched network may need to route IP packets using a mixture of the Ethernet, ATM, FR, and/or PPP layer 2 protocols. At least some of the nodes of the network may include a router that extracts a destination address from a network layer header contained within each packet. The router then used the destination address to determine the route or path along which the packet should be retransmitted. A typical packet may pass through a plurality of routers, each of which repeats the actions of extracting the destination address and determining the route or path along which the packet should be retransmitted.

In order to test a packet switched network or a device included in a packet switched communications network, test traffic comprising a large number of packets may be generated, transmitted into the network at one or more ports, and received at different ports. In this context, the term "port" refers to a communications connection between the network and the equipment used to test the network. The term "port unit" refers to a module within the network test equipment that connects to the network at a port. The received test traffic may be analyzed to measure the performance of the network. Each port unit connected to the network may be a source of test traffic, a destination for test traffic, or both a source of and a destination for test traffic. Each port unit may emulate a plurality of logical source or destination addresses. The number of port units and the communications paths that connect the port units to the network are typically fixed for the duration of a test session. The internal structure of the network may change during a test session, for example due to failure of a communications path or hardware device.

In order to test the capability of a network to survive or overcome a failure or other condition that impairs the performance of the network, impairments may be controllably introduced into the network. For example, voice over internet protocol (VoIP) networks may execute packet loss concealment strategies to replace packets that are lost during transmission over the network. To test such capability, a programmable impairment unit may be introduced into the network to cause a controlled number of packets to be dropped during transmission. An impairment unit may introduce other forms of impairment such as, for example, delaying packets for a fixed or randomly variable time period, reordering packets, introducing bit errors, duplicating packets, and other impairments.

For the purpose of collecting test data, the test traffic for each traffic item may be organized into packet groups, where a "packet group" is any plurality of packets for which network traffic statistics are accumulated. The packets in a given packet group may be distinguished by a packet group identifier (PGID) contained in each packet. The PGID may be, for example, a dedicated identifier field or combination of two or more fields within each packet.

For the purpose of reporting network traffic data, the test traffic for each traffic item may be organized into flows, where a "flow" is any plurality of packets for which network traffic statistics are reported. Each flow may consist of a single packet group or a small plurality of packet groups. Each packet group may typically belong to a single flow.

Within this description, the term "logic circuit" means a collection of hardware, which may be augmented by firmware and/or software, which performs a described function or set of functions. The term "logic circuit" encompasses combinatorial logic and sequential logic such as, for example, state machines. All or portions of a "logic circuit" may be implemented by a micro-controller or other processor. Logic circuits may typically be designed using a hardware description language (HDL) that defines the logic circuits primarily in functional terms. The HDL design may be verified using an HDL simulation tool. The verified HDL design may then be converted into a gate netlist or other physical description of the logic circuits in a process commonly termed "synthesis". The synthesis may be performed automatically using a synthesis tool. The gate netlist or other physical description may be converted into process instructions and masks for fabricating the engine within an application specific integrated circuit (ASIC).

A gate netlist or other physical description of logic circuits may be further converted into configuration data for implementing the logic circuits in a field programmable gate array (FPGA), a programmable logic device (PLD), or a programmable logic arrays (PLA), or other programmable semiconductor device, all of which will be referred to herein as "programmable circuit devices". Configuration data for programming a programmable circuit device may be stored in a memory or a machine readable storage medium and used to configure a programmable circuit device upon power-up of a test system. In this patent, the term "machine readable storage medium" means a hardware device for storing digital data. Examples of machine readable storage media include optical discs such as CD-ROM, CD-RW, and DVD discs; magnetic medium such as hard and flexible magnetic discs and magnetic tape; and nonvolatile semiconductor devices such as read-only and flash memories. The term "machine readable storage medium" is not intended to encompass transitory media such as signals and waveforms that may convey digital data.

Within this description, the terms "unit" and "engine" also means collections of hardware, which may be augmented by firmware and/or software, which may be on a larger scale or have a more focused function than a "logic circuit". The terms "logic circuit", "unit", and "engine" do not imply any physical separation or demarcation. All or portions of one or more logic circuits, units, and/or engines may be collocated on a common card, such as a network card or within a common programmable device, ASIC, or other circuit device.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

In block diagrams, arrow-terminated lines may indicate data paths rather than signals. Each data path may be multiple bits in width. For example, each data path may consist of 4, 8, 16, 64, 256, or more parallel connections.

DETAILED DESCRIPTION

Description of Apparatus

Figure 1:
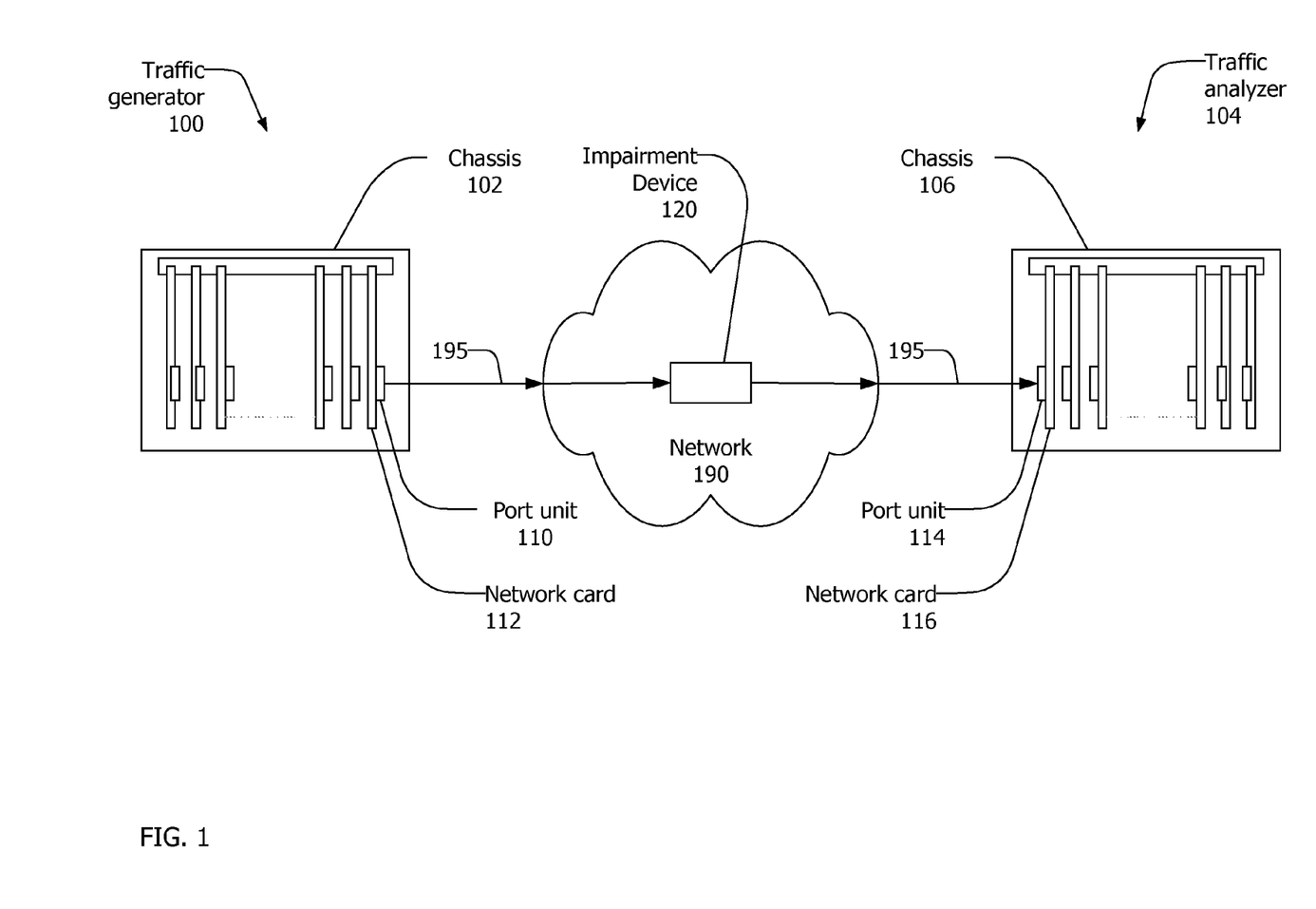
FIG. 1 is a block diagram of a network environment.

FIG. 1 shows a block diagram of a network test environment. The network test environment may include a traffic simulator 100, a traffic analyzer 104, and a network 190. One or more impairment units 120 may be introduced into the network 190. The traffic simulator 100 may generate test traffic that is received by the traffic analyzer 104 via the network 190.

The traffic simulator 100 may be a network test device, performance analyzer, conformance validation system, network analyzer, or network management system. The traffic simulator 100 may be a portion of the network 190 or a device within the network 190 performing self-testing. The traffic simulator 100 may include one or more network cards 112 enclosed within a chassis 102. The chassis 102 may be a fixed or portable chassis, cabinet, or enclosure suitable to contain the network test equipment. The traffic simulator 100 may be an integrated unit, as shown in FIG. 1. Alternatively, the traffic simulator 100 may comprise a number of separate units cooperative to provide traffic generation and/or analysis.

The traffic analyzer 104 may be a network test device, performance analyzer, conformance validation system, network analyzer, or network management system. The traffic analyzer 104 may be a portion of the network 190 or a device within the network 190 performing self-testing. The traffic analyzer 104 may include one or more network cards 116 enclosed within a chassis 106. The chassis 106 may be a fixed or portable chassis, cabinet, or enclosure suitable to contain the network test equipment. The traffic analyzer 104 may be an integrated unit, as shown in FIG. 1. Alternatively, the traffic analyzer 104 may comprise a number of separate units cooperative to provide traffic generation and/or analysis.

The traffic simulator 100 and the traffic analyzer 104 may be separate physical units, as shown, or may be combined in a single unit the both generates and receives test traffic. Network cards 112 and 116 may both generate and receive test traffic. When one or more network cards both generate and receive test traffic, the communications paths between the network cards and the network 190 may be bidirectional.

The network cards 112/116 may be permanently installed in the traffic simulator 100 and traffic analyzer 104 or may be removable. The network cards 112/116 may include one or more field programmable gate arrays (FPGAs), application specific integrated circuits (ASICs), programmable logic devices (PLDs), programmable logic arrays (PLAs), processors, and other kinds of programmable circuit devices. In addition, the network cards 112/116 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards.

Each network card 112/116 may contain one or more port unit 110/114. Each port unit 110/114 may connect to the network 190 through one or more ports. Each port unit 110/114 may be connected to the network 190 through a communications link 195, which may be a wire, an optical fiber, a wireless link, or other communications link. Each network card 112/116 may support a single communications protocol, may support a number of related protocols, or may support a number of unrelated protocols.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein collectively as "traffic" and individually as "packets". The network 190 may be comprised of numerous nodes interconnected by a mesh of communications paths, providing numerous physical and logical paths for data to travel. There may be plural logical communications paths between the traffic simulator 100 and the traffic analyzer 104.

The impairment unit 120 may be a separate physical device or a portion of one of the traffic simulator 100 and the traffic analyzer 104. The impairment unit 120 may be remotely located from the traffic simulator 100 and/or the traffic analyzer 104. The impairment unit 120 may be introduced into a designated communications path 195 within the network 190 such that at least some of the traffic from the traffic simulator 100 to the traffic analyzer 104 flows through the impairment unit 120. The impairment unit 120 may selectively impair some or all of the traffic that flows along the designated communications path 195. For example, the impairment unit 120 may selectively drop, delay, reorder, duplicate, and/or alter at least some packets that flow along the designated communications path 195.

The designated communications path 195 may be unidirectional, as shown in FIG. 1, or may be bidirectional. If the designated communications path 195 is bidirectional, the impairment unit 120 may be configured to selectively impair packets traveling in either direction (i.e. from left-to-right or right-to-left as shown in FIG. 1) along the designated communications path.

Figure 2:
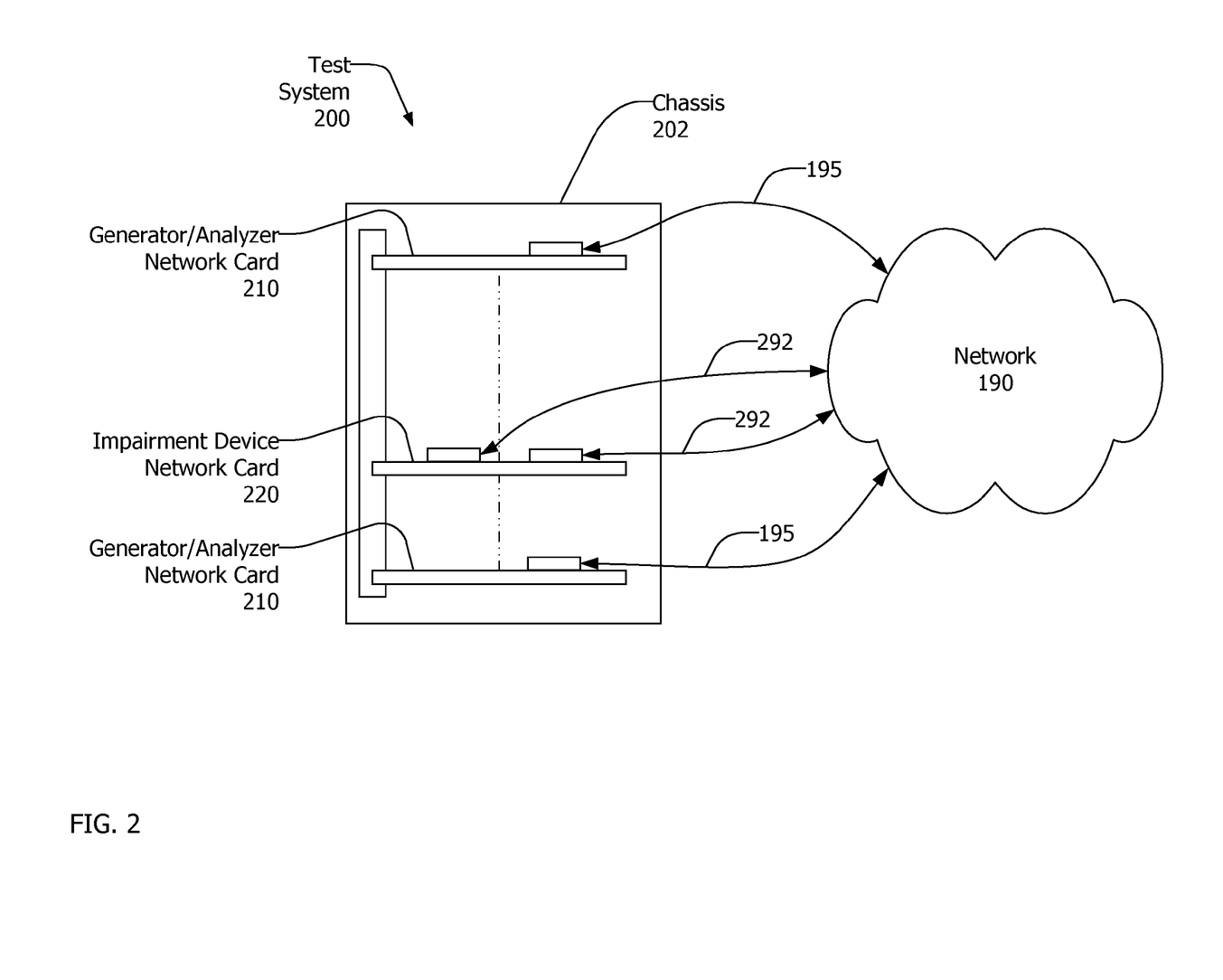
FIG. 2 is a block diagram of a network environment.

Referring now to FIG. 2, another network test environment may include a test system 200 coupled to the network 190. The test system 200 may include a plurality of generator/analyzer network cards 210 enclosed within a chassis 202. Each generator/analyzer network card 210 may include one or more port units connected to the network 190 via respective bidirectional communications links 195. At least some of the generator/analyzer network cards 210 may generate test traffic for transmission via the network 190. At least some of the generator/analyzer network cards 210 may receive and analyze test traffic from the network 190. Some or all of the generator/analyzer network cards 210 may both generate and analyze test traffic. The plurality of generator/analyzer network cards 210 may collectively perform the functions of the traffic simulator 100 and traffic analyzer 104 of FIG. 1.

The test system 200 may include one or more impairment unit network cards 220. The impairment unit network card 220 may include two ports connected to the network 190 by a pair of communications links 292. In effect, a designated communications path within the network 190 may be broken and connected to the two ports of the impairment unit network card 220. The communications links 292 may be unidirectional or bidirectional, in which case the impairment unit network card 220 may be configured to selectively impair packets traveling in either or both directions.

Figure 3:
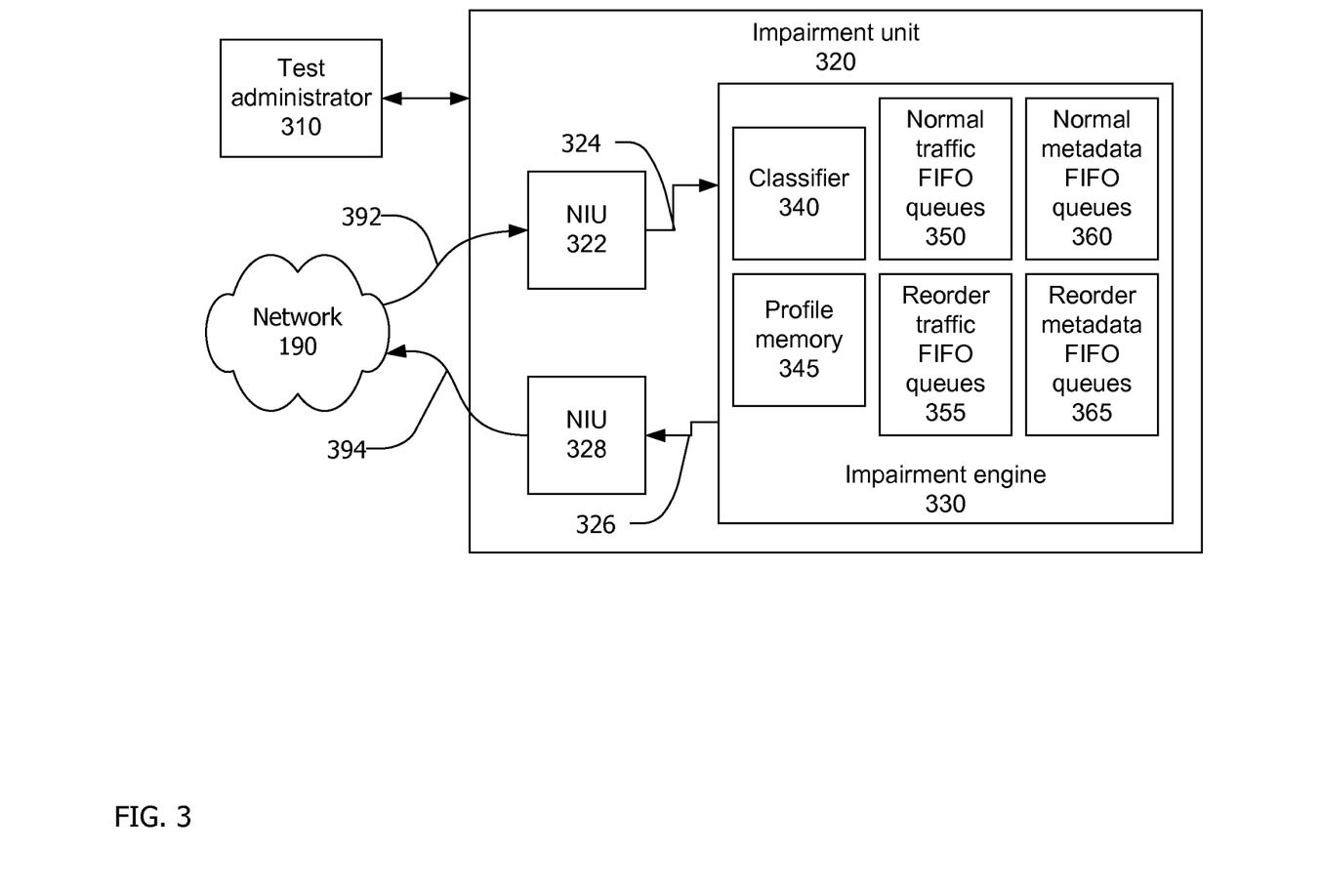
FIG. 3 is a block diagram of an impairment unit.

Referring now to FIG. 3, an impairment unit 320, which may be the impairment unit 120 or 220, may be coupled to the network 190 by two communications links 392, 394. The communications links 392, 394 which may be wires, optical fibers, wireless links, or other communication links. The impairment unit 320 may include a first network interface unit (NIU) 322, a second NIU 328, and an impairment engine 330.

The first NIU 322 may receive electrical, optical, or wireless signals from the network 190 over the communications link 392, and may convert the received signals into incoming traffic 324 in a format usable to the impairment engine 330. Similarly, the second NIU 328 may convert outgoing traffic 326 from the impairment engine 330 into the electrical, optical, or wireless signal format required to transmit the test traffic to the network 190 via the communications link 394.

For ease of discussion, the impairment unit 320 shown in FIG. 3 operates in a half-duplex manner, receiving packets over the communications link 392 and transmitting packet over the communications link 394. An impairment unit may operate in full-duplex manner, providing a bidirectional flow of packets between the communications links 392 and 394. A full-duplex impairment unit may use common hardware to process packets flowing in both directions. A full-duplex impairment unit may use separate hardware to process packets flowing in each direction, or a combination of common and separate hardware.

The impairment engine 330 may include a classifier 340 to classify packets within the incoming traffic 324 into a plurality of impairment classes. Each of the plurality of impairment classes may be uniquely associated with a corresponding one of a plurality of impairment profiles stored in a profile memory 345. The term "uniquely associated" means a one-to-one correspondence between members of two groups of elements. In this case, there is a one-to-one correspondence between impairment classes and impairment profiles. Each impairment profile may define one or more impairments to be applied to packets of the associated class. Each impairment profile may define both types of impairments and one or more parameters defining how each impairment is applied. For example, an impairment profile may define that the packets in the associated class should be delayed by a time period specified in the impairment profile, or that a specified portion of the packets in the associated class should be delayed until one or more subsequently-received packets of the same class have been transmitted (thus causing the delayed packets to be reordered). An impairment profile may define multiple impairments to be applied to a class. For example, an impairment profile may define that 1% of the packets in the associated class are reordered, 0.1% of the packets in the class are duplicated, and bit errors are introduced into 0.01% of the packet in the class. One of the plurality of impairment classes may be a default class for traffic that will not be impaired.

The profile memory 345 may be a contiguous block of memory such as random access memory. The profile memory 345 may be a plurality of registers, latches, or other memory circuits distributed within the impairment engine. The profile memory 345 may be a combination of random access memory, registers, latches, and other memory circuits.

The plurality of impairment profiles may be defined prior to a test session. For example, the plurality of impairment profiles may be defined by a test engineer using a test administrator computing device 310. The impairment profiles may be downloaded to the impairment unit 320 from the test administrator 310 before or during the test session. The downloaded impairment profiles may be stored in the profile memory 345.

The classifier 340 may classify each incoming packet based on the contents of the packet. For example, the classifier 340 may filter or parse the header of each packet and determine the class of each packet based on information such as IP source and destination addresses, source and destination ports, protocol, quality or type of service, and other data that can be extracted from the packet header. However, classifying each packet based on the packet header content may require a substantial amount of processing, particularly since the header content may be modified during transmission though the network. Modifications such as the addition of MPLS labels and/or IP header option or extension fields may move the location of some or all header content with respect to the start of the packet. Thus classifying packets based on header content may require the impairment unit to completely parse the packet header.

The classifier 340 may classify each incoming packet based on information contained in the payload of the packet.

For example, the classifier 340 may simply read an impairment class field within the payload of each packet. However, when testing a network, test traffic is commonly generated by test equipment such as the traffic simulator 100 or the generator/analyzer network cards 210. It may be impractical or infeasible to add an impairment class field to the payloads of packets generated by legacy test equipment. To maintain compatibility with legacy test equipment, the classifier 340 may determine the impairment class based on test information included in the payloads of some or all packets.

The impairment engine 330 may accept the incoming traffic 324 from the NIU 322 and may temporarily store incoming packets in one of plurality of traffic first-in first-out (FIFO) queues. Specifically, the impairment engine may include a plurality of normal traffic FIFO queues 350 and a plurality of reorder traffic FIFO queues 355. Each of the plurality of normal traffic FIFO queues 350 may be uniquely associated with a corresponding one of the plurality of impairment classes. The normal traffic FIFO queues 350 may be used to store packets that will not be reordered, with each normal traffic FIFO queue storing only packets from the corresponding impairment class. Similarly, each of the plurality of reorder traffic FIFO queues 355 may be uniquely associated with a corresponding one of the plurality of impairment classes. The reorder traffic FIFO queues 355 may be used to store packets that will be reordered, with each reorder traffic FIFO queue storing only packets from the corresponding impairment class. The impairment engine 330 may subsequently read stored packets from the normal traffic FIFO queues 350 and the reorder traffic FIFO queues 355 to form the outgoing traffic 326.

The impairment engine 330 may include a plurality of normal metadata FIFO queues 360 and a plurality of reorder metadata FIFO queues 365. Each of the plurality of normal metadata FIFO queues 360 may be uniquely associated with a corresponding one of the normal traffic FIFO queues 350. Similarly, each of the plurality of reorder metadata FIFO queues 365 may be uniquely associated with a corresponding one of the reorder traffic FIFO queues 355. Each entry in one of the normal metadata FIFO queues or reorder metadata FIFO queues may store metadata associated with a packet in the corresponding normal or reorder traffic FIFO queues.

The traffic FIFO queues 350, 355 and the associated metadata FIFO queues 360, 365 may be implemented separately, or may be interleaved. For example, metadata and packets may be interleaved in storage such that metadata associated with a given packet is stored immediately before or after the packet in a common block of memory.

Each of the FIFO queues 350, 355, 360, 365 may be implemented, for example, as one or more blocks of memory. Read and write pointers may be associated with each memory block to indicate where data should be read from or written into each memory block. The associated read and/or write pointers may be updated every time data is read from and/or written into a given memory block. The FIFO queues may be implemented in some other manner.

In this patent, the term "head end" refers to the position in a FIFO queue next to be read, and the term "tail" refers to the position in a FIFO queue into which data will next be written. A read pointer may hold an address for the head of the corresponding FIFO queue, and the write pointer may hold the address for the tail of the corresponding FIFO queue.

Figure 4:
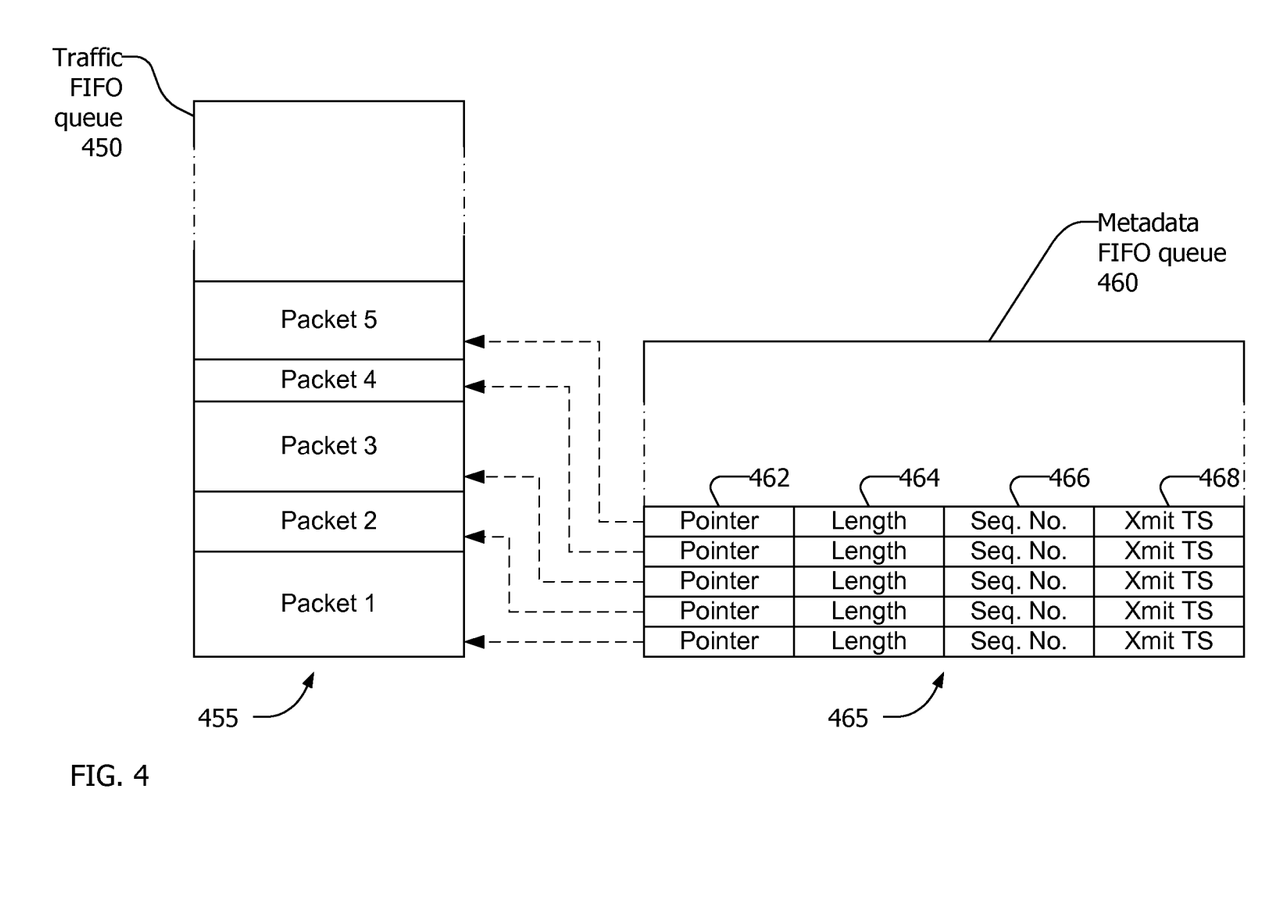
FIG. 4 is a graphical representation of queues in an impairment unit.

Referring now to FIG. 4, a metadata FIFO queue 460 (which may be any one of the normal or reorder metadata FIFO queues 360, 365) may store information used to retrieve data stored in an associated traffic FIFO queue 450 (which may be any one of the normal or reorder traffic FIFO queues 350, 355). The traffic FIFO queue 450 may store a plurality of packets (identified as Packet 1 through Packet 5) from a corresponding impairment class. In this example, packet 1 is stored at the head end 455 of the traffic FIFO queue 450. The metadata FIFO queue 460 may store one entry per packet in the associated traffic FIFO queue 450. In this example, the metadata associated with packet 1 is stored at the head end 465 of the metadata FIFO queue 460.

Each entry in the metadata FIFO queue 460 may include a pointer 462 which points to the location in the traffic FIFO queue 450 that stores the start of the corresponding packet. The pointer 462 may be, for example, a memory address or an index or offset that can be added to base memory address to locate the start of the corresponding packet. Each entry in the metadata FIFO queue may include a length 464 of the corresponding packet in the traffic FIFO queue 450. Alternatively, each entry may include an end pointer (not shown) which points to the location in the traffic FIFO queue 450 that stores the end of the corresponding packet. The pointer 462 and the length 464 or end pointer may be used to retrieve the entire corresponding packet from the traffic memory 450.

Each entry in the metadata FIFO queue 460 may include a sequence number 466. The sequence number 466 may be assigned as each packet in the corresponding impairment class is received by the impairment unit. Each of a plurality of impairment classes may have independent sequence numbering such that the sequence number 466 identifies the relative order of the corresponding packet within its own impairment class. Packets within each impairment class may be initially assigned sequential sequence numbers. If a particular packet is to be reordered (transmitted after one or more subsequently received packets in the same impairment class), the initial sequence number may be increased before being stored in the metadata FIFO queue 460. For example, the initial sequence number may be increased by K+1, where K is the number of sequentially received packets in the same impairment class that will be transmitted before the reordered packet.

Each entry in the metadata FIFO queue 460 may include a transmit timestamp 468. The impairment engine 330 may assign a transmit timestamp 468 as each packet is received and processed by the impairment unit. The transmit timestamp 468 may indicate a target transmit time for the associated packet. Each packet might not, however, actually be transmitted at that target transmit time due, for example, to conflicts with other packets awaiting transmission. The transmit timestamp 468 for a given packet may be determined based, at least in part, on the impairment class of the packet and the associated impairment profile. As will be described in the subsequent discussion of processes, a transmit timestamp might not be assigned for packets that will be reordered.

Figure 5:
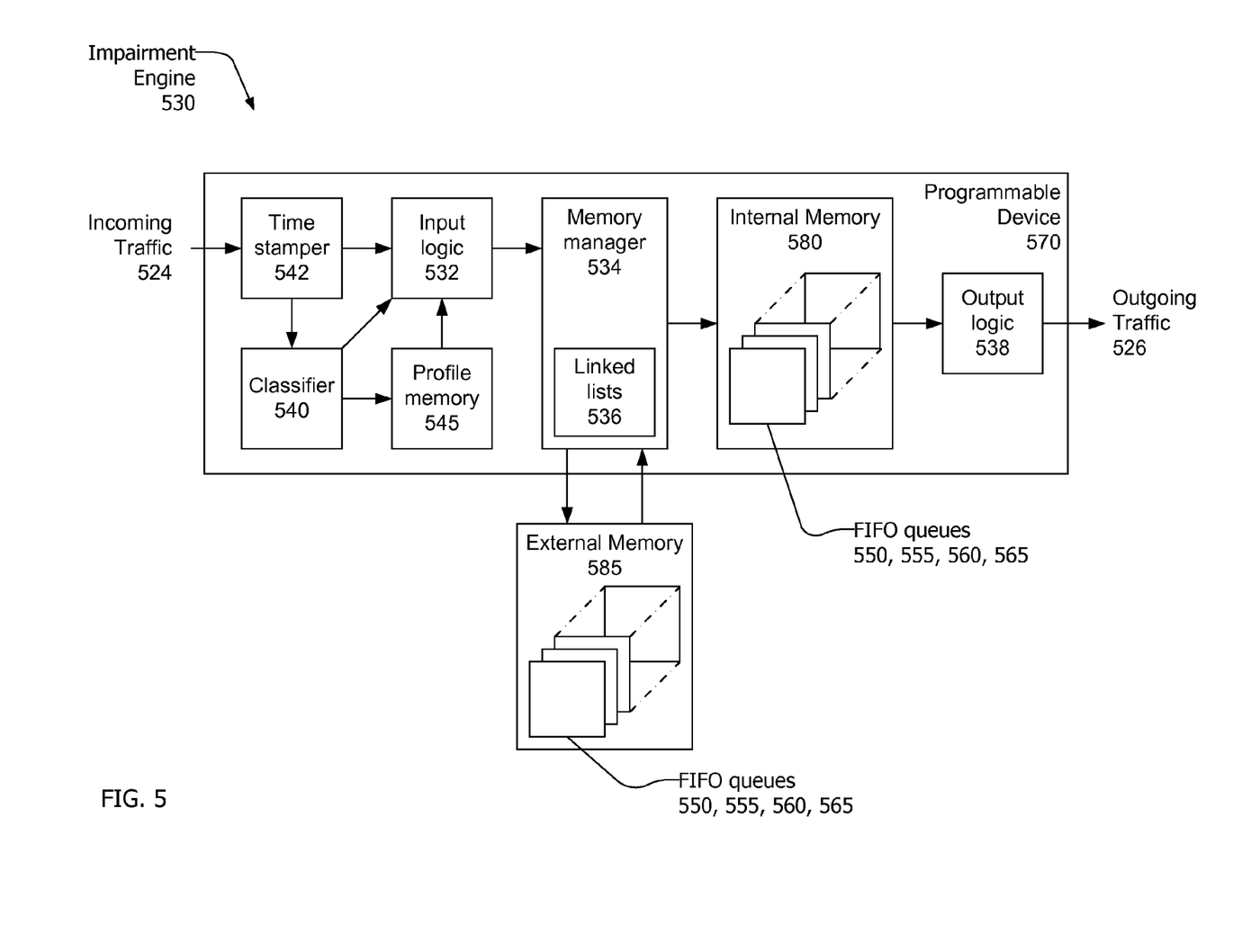
FIG. 5 is a block diagram of an impairment unit.

Referring now to FIG. 5, an impairment engine 530, which may be the impairment engine 330, may be implemented using a programmable device 570 coupled to external memory 585. The external memory may be, for example, dynamic or static random access integrated circuit memory chips external to the programmable device 570. The programmable device 570 may be, for example, one or more field programmable gate array (FPGA) integrated circuit chips.

The impairment engine 530 may maintain a plurality of FIFO queues including a plurality of normal traffic FIFO queues 550, a plurality of reorder traffic FIFO queues 555, a plurality of normal metadata FIFO queues 560, and a plurality of reorder metadata FIFO queues 565. These queues may be the corresponding queues 350, 355, 360, and 365 as previously discussed. The impairment engine 530 may maintain a normal traffic FIFO queue, a reorder traffic FIFO queue, a normal metadata FIFO queue, and a reorder metadata FIFO queue uniquely associated with each of a corresponding plurality of impairment classes.

The FIFO queues 550, 555, 560, 565 may be distributed between internal memory 580 within the programmable device 570 and external memory 585. For example, the head end of the FIFO queues (the end containing the packets next to be transmitted and the associated metadata) may be maintained in internal memory 580, and the back end of the queues may be maintained in external memory. In this case, received packets, and the associated metadata, may be first written into the internal memory 580 and then subsequently written into the external memory 585 when the portions of the FIFO queues within the internal memory 580 are filled. As packets are transmitted from the internal memory 580, packets and metadata may be moved from the external memory 585 to the internal memory 580.

A memory manager 534 may manage the writing of packets and associated metadata into the FIFO queues 550, 555, 560, 565 and may manage the transfer of packets and metadata from the external memory 585 to the internal memory 580. To this end, the memory manager may maintain linked lists 536 defining the relationships between portions of queues held in both internal and external memory.

The organization of the FIFO queues in the internal memory 580 and the external memory 585 may be the same or different. For example, the normal traffic FIFO queues 550, the reorder traffic FIFO queues 555, the normal metadata FIFO queues 560, and the reorder metadata FIFO queues 565 may be separately stored in the internal memory 580, but may be interleaved in the external memory 585.

Incoming traffic 524 may be received by a time stamper 542, which attaches or associates a receive time stamp to each received packet. Each received packet may be analyzed by a classifier 540 to determine an impairment class for each packet. The classifier 540 may be the classifier 340 as previously described. The impairment class may be used to retrieve an associated impairment profile from a profile memory. The profile memory 545 may be the profile memory 345 as previously described.

Input logic 532 may generate metadata associated with each received packet based on the receive time stamp from the time stamper 542, the impairment class from the classifier 540, and the associated impairment profile from the profile memory 545. The input logic 532 may assign an initial sequence number to each packet. Initial sequence numbers may be assigned independently between impairment classes and sequentially within each impairment class. The initial sequence number assigned to each received packet may indicate the packet's relative position, as received, within its impairment class. In order to assign the initial sequence numbers, the input logic may maintain a running count of the number of packets received in each impairment class.

The input logic may determine, based on the impairment profile and a count of the number of received packets for the impairment class, whether or not a specific received packet should be reordered. For example, if the impairment profile for a given impairment class indicates that every $64^{th}$ packet in the impairment class should be reordered, the input logic may determine if a specific received packet should be reordered based on the running count of received packets for the impairment class. Alternatively, the input logic may maintain a separate cyclic reorder counter to determine whether or not to reorder each received packet.

When the input logic determines that a specific received packet should be reordered, the input logic may adjust the initial sequence number assigned to the packet accordingly. For example, the input logic may adjust the initial sequence number assigned to the packet by adding K+1, where K is the number of sequentially received packets in the same impairment class that will be transmitted before the reordered packet. The value of K may be defined by the impairment profile for the impairment class of the specific received packet.

When the input logic determines that a specific received packet should not be reordered, the input logic may determine a transmit time stamp for the packet based on the received time stamp of the packet and the impairment profile for the impairment class of the packet. For example, when the impairment profile indicates that the packets within the impairment class are not impaired, the input logic may determine the transmit time stamp by a adding a fixed latency to the value of the input timestamp. The fixed latency may be the minimum time required for an impairment unit to receive, process, and transmit a packet. When the impairment profile indicates that all packets within the impairment class should be delayed by a predetermined delay time greater than the fixed latency, the input logic may determine the transmit time stamp by adding the predetermined delay time to the receive time stamp. When the impairment profile indicates that jitter should be introduced into the impairment class, the input logic may determine the transmit time stamp by adding a randomly generated delay time to the receive time stamp. Both a predetermined delay time and a randomly generated delay time may be added to the received time stamp if required by the impairment profile.

Each received packet and the associated metadata including the initial or updated sequence number and transmit timestamp (for packets that will not be reordered) may be provided to the memory manager 534. The memory manager 534 may then store each packet and the associated metadata within the appropriate queues in the internal memory 580 or the external memory 585. The output logic may then determine, based on the associated stored metadata, which stored packet should be retrieved from memory and transmitted as the outgoing traffic 526. The function of the output logic will be further discussed in the following description of processes.

Description of Processes

Figure 6:
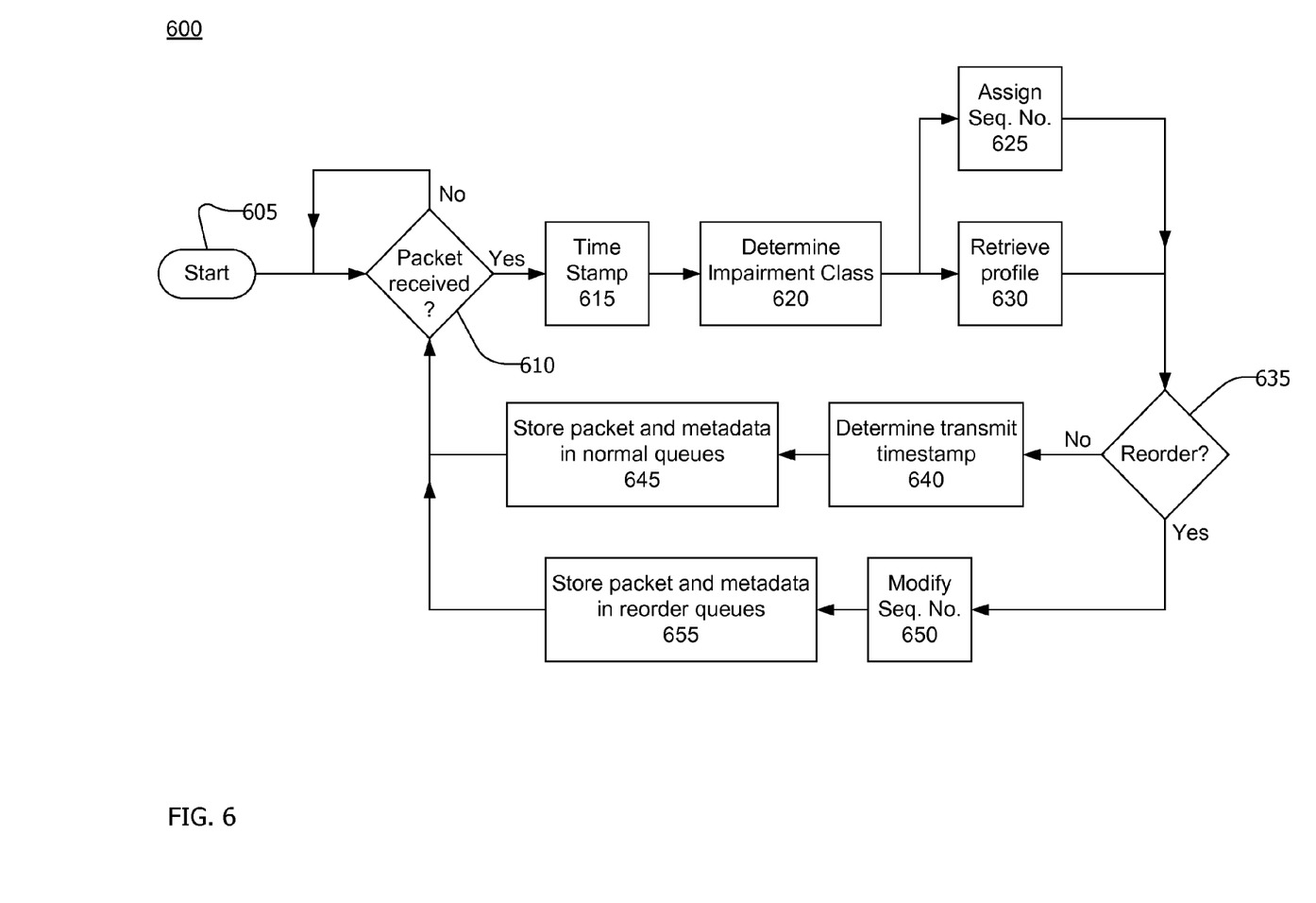
FIG. 6 is a flow chart of a process for receiving traffic in an impairment unit.
Figure 7:
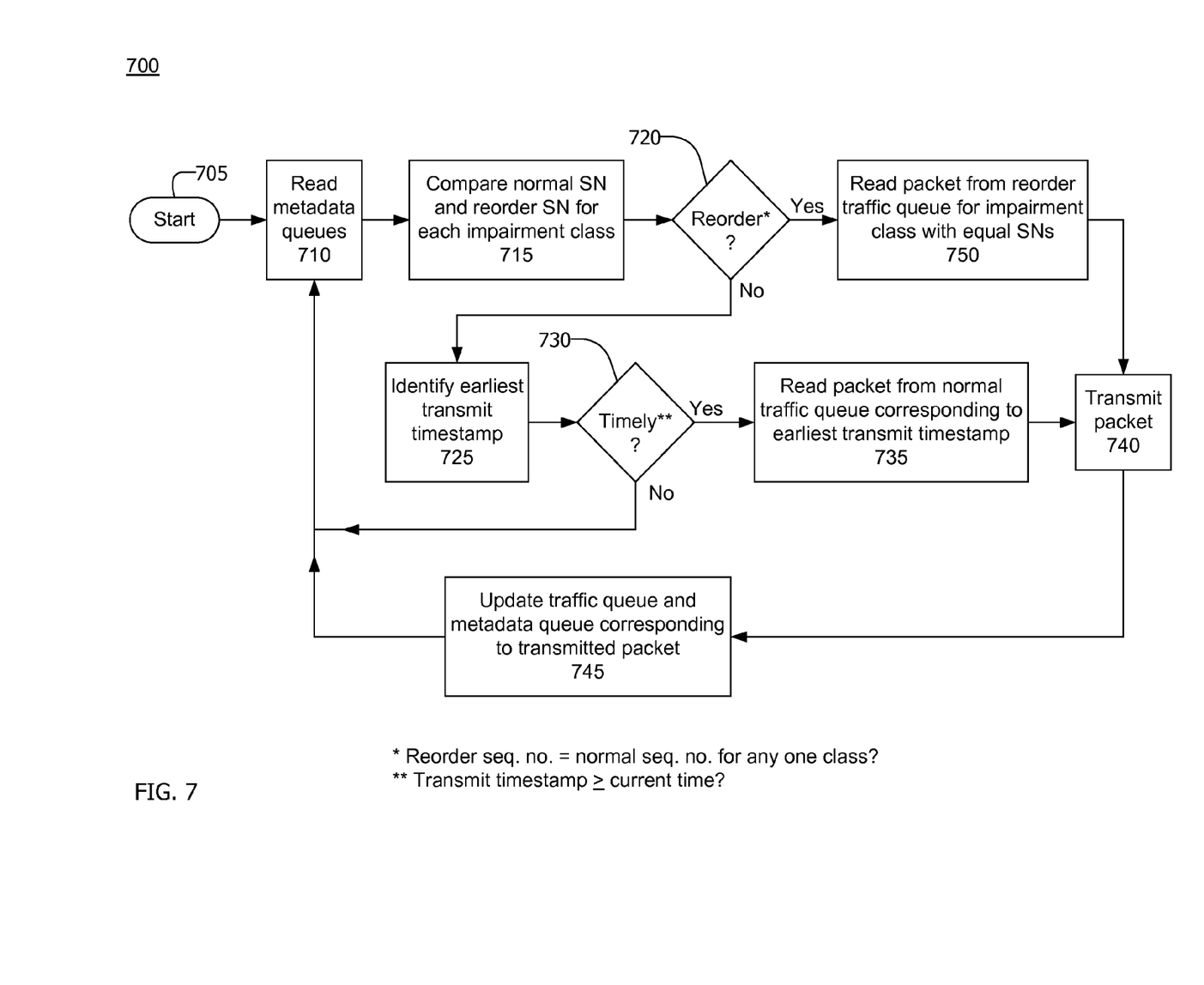
FIG. 7 is a flow chart of a process for transmitting traffic in an impairment unit.

FIG. 6 and FIG. 7 collectively show a flow chart for a process for impairing network traffic. FIG. 6 shows a flow chart of a process 600 for receiving network traffic and storing the traffic and associated metadata in queues within an impairment unit such as the impairment unit 320. FIG. 7 shows a flow chart of a process 700 for retrieving and transmitting network from queues within the impairment unit. The processes 600 and 700 may be performed by an impairment unit, such as the impairment unit 320, including a plurality of normal traffic FIFO queues, a plurality of reorder traffic FIFO queues, a plurality of normal metadata FIFO queues, and a plurality of reorder metadata FIFO queues.

The process 600 and the process 700 may be performed simultaneously within an impairment unit. Since the process 600 and the process 700 may require writing to and reading from the same memory bank, the process 600 and the process 700 may be performed in synchronization. Not shown in FIG. 6 and FIG. 7 is a continuous process of moving packets and associated metadata from external memory (such as external memory 585) to internal memory (such as internal memory 580), which may be performed simultaneously and synchronously with the process 600 and 700.

Referring now to FIG. 6, the process 600 may start at 605 when a test session is initiated. The process 600 may be cyclic in nature and the actions from 610 to 645 or 655 may be repeated for each packet within the received network traffic.

The actions within the process 600 may be performed concurrently or consecutively, or a combination thereof. Some or all of the actions within the process 600 may be performed in a pipelined manner such that different actions are performed on different received packets concurrently. The process 600 may be performed by hardware within the impairment unit, such as the time stamper 542, the classifier 540, the profile memory 545, the input logic 532, and the memory manger 534 of the impairment engine 530 of FIG. 5.

The process 600 may loop at 610 until a packet is received. When a packet is received, a received timestamp may be assigned to the received packet at 615, and an impairment class of the received packet may be determined at 620. The impairment class determined at 620 may be one of a plurality of impairment classes defined for the impairment unit. The impairment class of the received packet may be determined based upon information contained within the received packet. For example, the impairment class of the received packet may be determined based on fields within the packet header, or based on test data embedded within the packet payload, or in some other manner.

After the impairment class of the received packet is determined at 620, an initial sequence number may be assigned to the received packet at 625. The sequence number assigned at 625 is considered an "initial" sequence number since the sequence number may be subsequently modified before being stored as metadata associated with the received packet. Initial sequence numbers may be assigned independently between impairment classes and sequentially to packets within each impairment class. For example, an impairment engine may include a plurality of counters, each counter uniquely associated with a corresponding impairment class, to maintain a running count of the number of packets received within each impairment class. The counter associated with a given class may be incremented each time a packet within that class is received, and the counter value may be assigned as the initial sequence number of the received packet.

Also after the impairment class of the received packet is determined at 620, an impairment profile associated with the impairment class may be retrieved at 630. The impairment profile may contain information indicating what impairments, if any, should be applied to the packets within the impairment class. A plurality of impairment profiles, each uniquely associated with a corresponding one of the plurality of impairment classes, may be loaded into an impairment unit prior to a test session. Impairment profiles may be modified during a test session. The actions at 625 and 630 may be done concurrently or sequentially in any order.

At 635, a determination may be made whether or not the packet received at 610 should be reordered. The determination may be made based on the impairment profile retrieved at 630 and, in some circumstances, the initial sequence number assigned to the received packet at 625. For example, the impairment profile retrieved at 630 may indicate that none of the packets in the impairment class of the received packet will be reordered. In this case, the determination made at 635 is "no" for all packet in that impairment class Alternatively, the impairment profile retrieved at 630 may indicate that a predetermined portion of the packets in the impairment class of the received packet will be reordered. In this case, the determination whether or not a specific received packet will be reordered may be made at 635 in a variety of ways. For a first example, the predetermined portion of packets within an impairment class to be reordered may be constrained to only inverse powers of two (50%, 25%, 12.5%, etc.). In this case, whether or not a given packet in the impairment class will be reordered can be determined from the least significant bits of the initial sequence number assigned at 625. If the predetermined portion of packets to be reordered is not constrained to be an inverse power of two, the determination at 635 may be made, for further example, by multiplying the initial sequence number assigned at 625 by a fractional number. Alternatively, an impairment unit may provide a programmable cyclic reorder counter for each impairment class. For example, to impair 0.25% of the packet in an impairment class, the impairment unit may provide a counter that is programmed to cyclically count down from 399 down to zero, decrementing each time a packet in the impairment class is received. When the counter reaches zero, the next received packet is the impairment class is reordered. The determination at 635 may be made in some other manner.

When a determination is made at 635 that the received packet will not be reordered, a transmit timestamp for the received packet may be determined at 640. The transmit timestamp determined at 640 may indicate a target transmit time for the associated packet. The transmit timestamp may be determined based, at least in part, on the impairment class of the received packet and the impairment profile retrieved at 630. For example, when the impairment profile from 630 indicates that the packets within the impairment class are not impaired, the transmit timestamp may be determined at 640 by adding a fixed latency to the value of the receive timestamp from 615. The fixed latency may be the minimum time required for an impairment unit to receive, process, and transmit a packet. When the impairment profile from 630 indicates that all packets within the impairment class should be delayed by a predetermined delay time greater than the fixed latency, the transmit timestamp may be determined at 640 by adding the predetermined delay time to the receive time stamp from 615. When the impairment profile indicates that jitter should be introduced into the impairment class, the transmit time stamp may be determined at 640 by adding a randomly generated delay time to the receive time stamp from 615. Both a predetermined delay time and a randomly generated delay time may be added to the received time stamp if required by the impairment profile.

At 645, the received packet may be stored in the normal traffic FIFO queue associated with the impairment class of the received packet. Additionally, at 645, metadata associated with the received packet may be stored in a normal metadata FIFO queue associated with the impairment class of the received packet. The metadata stored at 645 may include the original sequence number assigned to the received packet at 625 and the transmit timestamp determined as 640. As described in conjunction with FIG. 4, the metadata stored at 645 may also include a pointer to the packet stored in the normal traffic FIFO queue and a length or end-pointer.

When a determination is made at 635 that the received packet will be reordered, the sequence number assigned to the received packet at 625 may be modified at 650. Specifically, the sequence number of a received packet to be reordered may be set equal to the expected sequence number of the packet within the same impairment class that will be transmitted next after the reordered packet. For example, when a single received packet is to be reordered, the initial sequence number may be set to ISN+K+1 at 650, where ISN is the initial sequence number of the first packet to be reordered from 625 and K is the number of sequentially received packets in the same impairment class that will be transmitted before the reordered packet. When multiple consecutive packets will be reordered, the sequence number for each of the packets to be reordered may be set to ISN+K+N at 650, where ISN and K were previously defined and N is the number of consecutive packets to be reordered.

At 655, the received packet to be reordered may be stored in a reorder traffic FIFO queue associated with the impairment class of the received packet. Additionally, at 645, metadata associated with the received packet may be stored in a reorder metadata FIFO queue associated with the impairment class of the received packet. The metadata stored at 655 may include the modified sequence number determined as 650. As described in conjunction with FIG. 4, the metadata stored at 655 may also include a pointer to the packet stored in the normal traffic FIFO queue and a length or end-pointer. Since the reordered packet will be transmitted based upon the value of the modified sequence number, the metadata stored at 655 need not include a transmit timestamp.

After the received packet and associated metadata are stored at 645 or 655, the process 600 may return to 610 to await reception of anther packet. The process may continue cyclically until the test session is complete.

Referring now to FIG. 7, the process 700 may start at 705 when a test session is initiated. The process 700 may be cyclic in nature and the actions from 710 to 750 may be repeated for each packet transmitted as outgoing network traffic. The actions within the process 700 may be performed concurrently or consecutively, or a combination thereof. Some or all of the actions within the process 700 may be performed in a pipelined manner such that different actions are performed on different packets concurrently. The process 700 may be performed by hardware within the impairment unit such as the output logic 538 of the impairment engine 530. The process 700 may start at 705 when a test session is initiated and may continue cyclically until the test session is completed.

At 710, the metadata at the head ends of all of the plurality of normal metadata FIFO queues and the plurality of reorder metadata FIFO queues may be read. The metadata read at 710 may include at least the sequence numbers of the packets stored at the head ends of the normal and reorder traffic FIFO queues. Other metadata, including pointers to the corresponding packets stored in traffic FIFO queues, packet lengths, and transmit timestamps may also be read at 710.

At 715, the sequence numbers read from the normal metadata FIFO queues and the sequence numbers read from the corresponding reorder metadata FIFO queues may be compared for each of the plurality of traffic classes. If the impairment engine is configured for N traffic classes, N comparisons of pairs of sequence numbers may be made at 715.

At 720, a determination may be made whether or not to transmit a reordered packet. Specifically, if the sequence number read from the normal metadata FIFO queue is not equal to the sequence number read from the corresponding reorder metadata FIFO queue for all of the plurality of traffic classes, a determination may be made that a reordered packet should not be transmitted (No at 720). In this case, the transmit times from the plurality of normal metadata FIFO queues may be compared at 725 and the earliest timestamp may be identified.

A determination may be made at 730 whether or not the earliest timestamp identified at 725 is timely, which is to say if the earliest timestamp identified at 725 is equal to or later than a present time. The present time may be provided by an internal clock within the impairment unit, which may also be used to assign receive timestamps to incoming packets at 615 in the process 600. When a determination is made at 730 that the earliest timestamp is not yet timely, the process 700 may repeat cyclically from 710 until the earliest timestamp becomes timely.

When a determination is made at 730 that the earliest timestamp identified at 725 is equal to or later than the present time, the corresponding packet may be read from the normal traffic FIFO queue corresponding to the earliest timestamp at 735 and may be transmitted to the network at 740. At 745, the traffic FIFO queue and the metadata FIFO queue corresponding to the transmitted packet may be updated to reflect the transmission of the packet. The process 700 may then repeat from 710 to select the next packet to be transmitted.

In some circumstances, two or more received packets may be assigned identical transmit timestamps. When the earliest timestamp identified at 725 is duplicated (i.e. read from two or more of the normal metadata FIFO queues), priority logic (not shown) may be applied at 735 to select one of the packets having the earliest timestamp to be read and transmitted. For example, the priority logic may select the packet randomly or in round-robin fashion, or the priority logic may select the packet from the traffic class having the most full traffic FIFO queue.

At 720, if the sequence number read from the normal metadata FIFO queue is equal to the sequence number read from the corresponding reorder metadata FIFO queue for a specific traffic class, a determination may be made that a reordered packet should be transmitted (Yes at 720). In this case, a packet at the head end of the reorder traffic FIFO queue for the specific traffic class may be read at 740 and transmitted to the network at 735. The read pointer for the reorder traffic FIFO for the specific traffic class queue may be updated at 745 and the process 700 may return to 710 to select the next packet to be transmitted.

Figure 8:
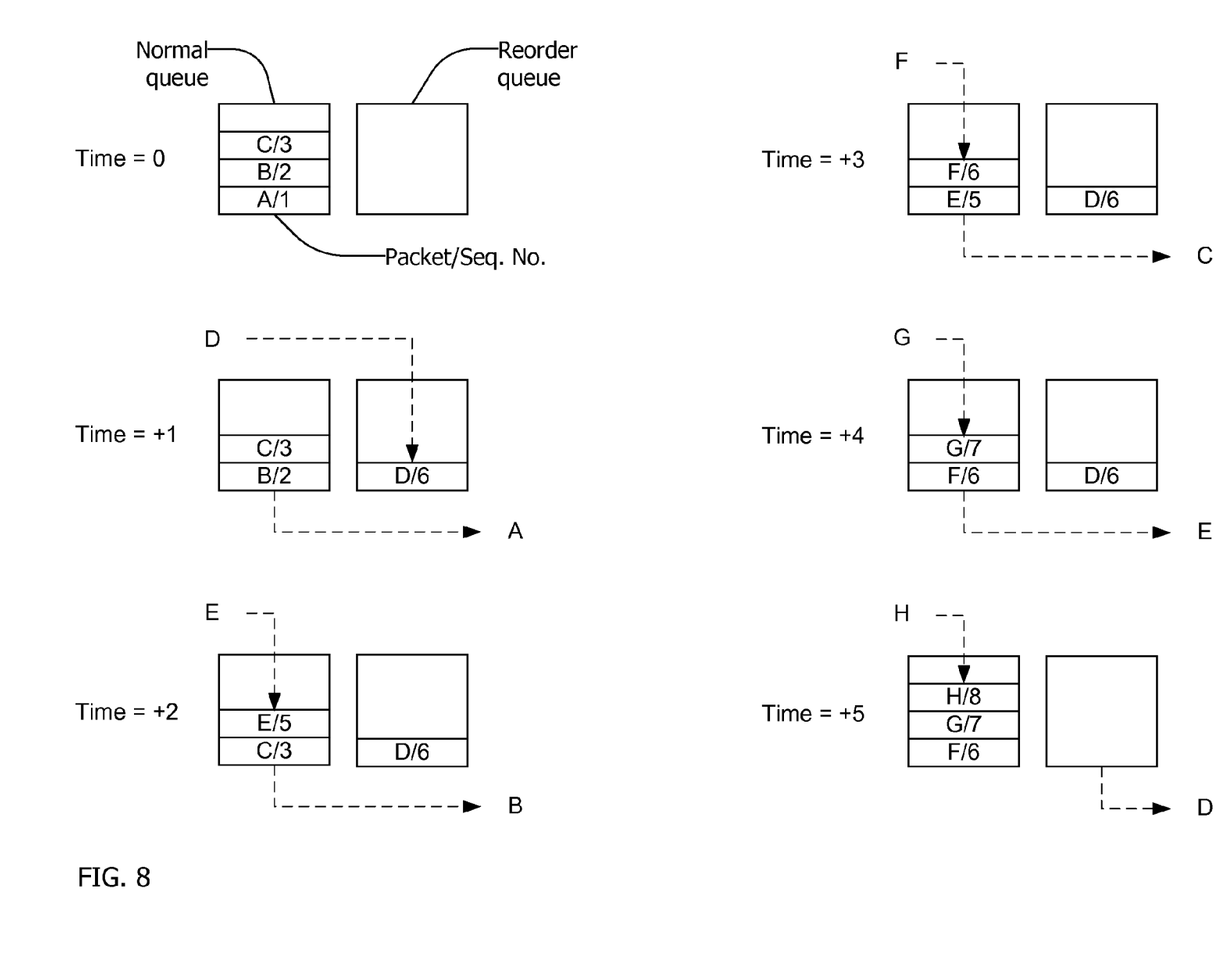
FIG. 8 is a graphical representation of traffic reordering in an impairment unit.

FIG. 8 provides a simplified example of the operation of an impairment unit using the processes 600 and 700. In this example, all packets are assumed to have the same length. Packets are identified by a single letter, and the sequence number assigned (within the impairment unit) to each packet is an integer. The notation "A/1" means "packet A which has been assigned sequence number 1". FIG. 8 is a graphic illustration of the contents of a normal queue and a reorder queue at the ends of six consecutive time intervals. The time interval is considered to be the time required to received and/or transmit one packet. FIG. 8 assumes that packets A, B, C . . . H are received in alphabetical order, that all packets belong to the same impairment class, and that packets A, B, and C have already been received at time=0.

At the end of the first time interval (time=0), packets A, B, and C have been received and stored in a normal traffic FIFO queue. Packets A, B, and C were sequentially assigned sequence numbers 1, 2, and 3 as they were received. At time=0, the reorder traffic FIFO queue is empty.

At the end of the second time interval (time=+1), packet A has been transmitted and removed from the normal traffic FIFO queue and packet D has been received. However, since packet D is to be reordered, packet D has been assigned sequence number 6 (instead of 4) and has been stored in the reorder traffic FIFO queue. The fact that packet D is to be reordered may have been determined based on an impairment profile associated with the assumed impairment class.

During the third time interval, the impairment engine may read (from associated metadata FIFO queues) the sequence numbers of the two packets at the head ends of the normal traffic FIFO queue and the reorder traffic FIFO queue. Since the two sequence numbers (2 and 6) are not equal, packet B from the normal traffic FIFO queue is transmitted. Concurrently, packet E is received, assigned sequence number 5, and stored in the normal traffic FIFO queue. Thus at time=+2, the normal traffic FIFO queue holds packets C and E, and the reorder traffic FIFO queue holds packet D.

During the fourth time interval, the impairment engine may again read the sequence numbers of the two packets at the head ends of the normal traffic FIFO queue and the reorder traffic FIFO queue. Since the two sequence numbers (3 and 6) are not equal, packet C from the normal traffic FIFO queue is transmitted. Concurrently, packet F is received, assigned sequence number 6, and stored in the normal traffic FIFO queue. Thus at time=+3, the normal traffic FIFO queue holes packets E and F, and the reorder traffic FIFO queue holds packet D.

During the fifth time interval, the impairment engine may again read the sequence numbers of the two packets at the head ends of the normal traffic FIFO queue and the reorder traffic FIFO queue. Since the two sequence numbers (5 and 6) are not equal, packet E from the normal traffic FIFO queue is transmitted. Concurrently, packet G is received, assigned sequence number 7, and stored in the normal traffic FIFO queue. Thus at time=+4, the normal traffic FIFO queue holes packets F and 6, and the reorder traffic FIFO queue holds packet D.

During the sixth time interval, the impairment engine may again read the sequence numbers of the two packets at the head ends of the normal traffic FIFO queue and the reorder traffic FIFO queue. In this case, however, the two sequence numbers both equal 6. Thus packet D from the reorder traffic FIFO queue is transmitted. Concurrently, packet H is received, assigned sequence number 8, and stored in the normal traffic FIFO queue. Thus at time=+4, the normal traffic FIFO queue holes packets F, G, and H, and the reorder traffic FIFO queue is empty. While the packets A, B, C, D, and E were received in alphabetical order, the order of transmission was A, B, C, E, D, thus accomplishing the desired reordering of packet D.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A unit, comprising:
a receiver to receive packets from a network;
input logic to
   assign sequential sequence numbers to the received packets,
   determine whether or not each received packet will be reordered, wherein reordered packets are retransmitted after one or more subsequently received packet,
   when the received packet is not to be reordered, store the received packet in a normal traffic first-in first-out (FIFO) queue and store the assigned sequence number as metadata associated with the received packet, and
   when the received packet is to be reordered, store the received packet in a reorder traffic FIFO queue, modify the assigned sequence number to equal the anticipated sequence number of a subsequently-received packet to be transmitted immediately after the reordered received packet, and store the modified sequence number as metadata associated with the received packet;
output logic to
   read a first sequence number associated with a packet at a head end of the normal traffic FIFO queue and a second sequence number associated with a packet at a head end of the reorder traffic FIFO queue, and
   select one of the packet at the head end of the normal traffic FIFO queue and the packet at the head end of the reorder traffic FIFO queue based on the respective sequence numbers; and
a transmitter to transmit the packet selected by the output logic to the network.

2. The unit of claim 1, wherein
the output logic selects the packet at the head end of the normal packet FIFO queue when the first and second sequence numbers are not equal, and
the output logic selects the packet at the head end of the reorder packet FIFO queue when the first and second sequence numbers are equal.

3. The unit of claim 1, wherein
when the received packet is not to be reordered, the assigned sequence number is stored in a normal metadata queue, and
when the received packet is to be reordered, the modified sequence number is stored in a reorder metadata queue.

4. A unit, comprising:
a receiver to receive packets from a network;
a classifier to determine impairment classes of the received packets, an impairment class of each packet selected from a plurality of impairment classes, each impairment class uniquely associated with a corresponding one of a plurality of normal traffic first-in first-out (FIFO) queues and a corresponding one of a plurality of reorder traffic FIFO queues;
input logic to
   assign sequence numbers to the received packets, the sequence numbers assigned independently between impairment classes and sequentially for packets within each of the plurality of impairment classes
   determine whether or not each received packet will be reordered, wherein reordered packets are retransmitted after one or more subsequently received packet in the same impairment class,
   if the received packet will not be reordered, store the received packet in the normal traffic FIFO queue associated with the impairment class of the received packet and store the assigned sequence number as metadata associated with the received packet, and if the received packet will be reordered, store the received packet in the reorder traffic FIFO queue associated with the impairment class of the received packet, modify the assigned sequence number to equal the anticipated sequence number of a subsequently-received packets to be transmitted immediately after the reordered received packet, and store the modified sequence numbers as metadata associated with the received packets;

output logic to select packets from head ends of the plurality of normal traffic FIFO queues and the plurality of reorder traffic FIFO queues to provide a sequence of packets as outgoing traffic; and a transmitter to transmit the outgoing traffic to the network.

5. The unit of claim 4, further comprising:
a profile memory to store a plurality of impairment profiles, each uniquely associated with a corresponding one of the plurality of impairment classes,
wherein the input logic determines whether or not each received packet will be reordered based on the impairment profile associated with the impairment class of the received packet.

6. The unit of claim 4, wherein
the output logic selects the sequence of packets based, in part, on the sequence numbers assigned to the received packets.

7. The unit of claim 4, further comprising:
a plurality of normal metadata FIFO queues, each normal metadata FIFO queue to store metadata associated with a corresponding one of the plurality of normal traffic FIFO queues; and
a plurality of reorder metadata FIFO queues, each reorder metadata FIFO queue to store metadata associated with a corresponding one of the plurality of reorder traffic FIFO queues.

8. The unit of claim 7, the output logic further to
for each impairment class, compare a sequence number from the head end of the corresponding normal metadata FIFO queue with a sequence number from the head end of the corresponding reorder metadata FIFO queue,
if the sequence number from the head end of a specific normal metadata FIFO queue is equal to the sequence number from the head end of the corresponding reorder metadata FIFO queue, select the packet at the head end of the corresponding reorder traffic FIFO queue to add to the outgoing traffic, and
if the sequence number from the head end of the normal metadata FIFO queue is not equal to the sequence number from the head end of the corresponding reorder metadata FIFO queue for all impairment classes, select a packet from a head end of one of the normal traffic FIFO queue to add to the outgoing traffic.

9. The unit of claim 8, wherein
if the sequence number from the head end of the normal metadata FIFO queue is not equal to the sequence number from the head end of the corresponding reorder metadata FIFO queue for all impairment classes, the output logic selects a packet from a head end of one of the normal traffic FIFO queue based on target transmit timestamps associated with the packets at the head ends of the normal traffic FIFO queues.

10. The unit of claim 9, further comprising:
a time stamper to associate a receive timestamp to each received packet, the input logic further to, for each received packet that will not be reordered:
determine the target transmit timestamp associated with the received packet based on the associated receive timestamp and the impairment profile for the impairment class of the received packet, and
store the target transmit timestamp as metadata associated with the received packet.

11. A method, comprising:
receiving packets from a network;
assigning sequential sequence number to the received packets,
determining whether or not a received packet will be reordered, wherein reordered packets are retransmitted after one or more subsequently received packet;
when the received packet is not to be reordered, storing the received packet in a normal traffic first-in first-out (FIFO) queue and storing the assigned sequence number as metadata associated with the received packet;
when the received packet is to be reordered, storing the received packet in a reorder traffic FIFO queue, modifying the assigned sequence number to equal the anticipated sequence number of a subsequently-received packet to be transmitted immediately after the reordered received packet, and storing the modified sequence number as metadata associated with the received packet;
reading a first sequence number associated with a packet at a head end of the normal traffic FIFO queue and a second sequence number associated with a packet at the head end of the reorder traffic FIFO queue;
selecting one of the packet at a head end of the normal traffic FIFO queue and the packet at the head end of the reorder traffic FIFO queue based on the respective sequence numbers; and
transmitting the selected packet to the network.

12. The method of claim 11, wherein selecting one of the packets further comprises:
selecting the packet at the head end of the normal packet FIFO queue when the first and second sequence numbers are not equal; and
selecting the packet at the head end of the reorder packet FIFO queue when the first and second sequence numbers are equal.

13. The method of claim 11, wherein
when the received packet is not to be reordered, the assigned sequence number is stored in a normal metadata queue, and
when the received packet is to be reordered, the modified sequence number is stored in a reorder metadata queue.

14. A method of impairing network traffic, comprising:
receiving packets from a network;
determining impairment classes of the received packets, an impairment class of each packet selected from a plurality of impairment classes, each impairment class uniquely associated with a corresponding one of a plurality of normal traffic first-in first-out (FIFO) queues and a corresponding one of a plurality of reorder traffic FIFO queues;
assigning sequence numbers to the received packets, the sequence numbers assigned independently between impairment classes and sequentially for packets within each of the plurality of impairment classes;
determining whether or not each received packet will be reordered, wherein each reordered packet is retransmitted after one or more subsequently received packet in the same impairment class;

if the received packet will not be reordered, storing the received packet in the normal traffic FIFO queue associated with the impairment class of the received packet, and storing the assigned sequence number as metadata associated with the received packet;

if the received packet will be reordered, storing the received packet in the reorder traffic FIFO queue associated with the impairment class of the received packet, modifying the assigned sequence number to equal the anticipated sequence number of a subsequently-received packet to be transmitted immediately after the reordered received packet, and storing the modified sequence number as metadata associated with the received packet;

selecting packets from head ends of the plurality of normal traffic FIFO queues and the plurality of reorder traffic FIFO queues to provide a sequence of packets as outgoing traffic; and transmitting the outgoing traffic to the network.

15. The method of claim 14, further comprising:

storing a plurality of impairment profile, each impairment profile uniquely associated with a corresponding one of the plurality of impairment classes, wherein determining whether or not each received packet will be reordered is based on the impairment profile associated with the impairment class of the received packet.

16. The method of claim 14, wherein the output logic selects the sequence of packets based, in part, on the sequence numbers assigned to the received packets.

17. The method of claim 14, wherein metadata associated with packets stored in each of the plurality of normal traffic FIFO queues is stored in a corresponding one of a plurality of normal metadata FIFO queues; and metadata associated with packets stored in each of the plurality of reorder traffic FIFO queues is stored in a corresponding one of a plurality of reorder metadata FIFO queues.

18. The method of claim 17, wherein selecting packets further comprises for each impairment class, comparing a sequence number from the head end of the corresponding normal metadata FIFO queue with a sequence number from the head end of the corresponding reorder metadata FIFO queue, if the sequence number from the head end of a specific normal metadata FIFO queue is equal to the sequence number from the head end of the corresponding reorder metadata FIFO queue, selecting the packet at the head end of the corresponding reorder traffic FIFO queue to add to the outgoing traffic, and if the sequence number from the head end of the normal metadata FIFO queue is not equal to the sequence number from the head end of the corresponding reorder metadata FIFO queue for all impairment classes, selecting a packet from a head end of one of the normal traffic FIFO queue to add to the outgoing traffic.

19. The method of claim 18, further comprising:

if the sequence number from the head end of the normal metadata FIFO queue is not equal to the sequence number from the head end of the corresponding reorder metadata FIFO queue for all impairment classes, selecting a packet from a head end of one of the normal traffic FIFO queue based on target transmit timestamps associated with the packets at the head ends of the normal traffic FIFO queues.

20. The method of claim 19, further comprising:

associating a receive timestamp to each received packet; and for each received packet that will not be reordered:

determining the target transmit timestamp associated with the received packet based on the associated receive timestamp and the impairment profile for the impairment class of the received packet, and storing the target transmit timestamp as metadata associated with the received packet.

\* \* \* \* \*